(12) United States Patent
Koyanagi et al.

(10) Patent No.: US 9,143,049 B2
(45) Date of Patent: Sep. 22, 2015

(54) THREE-LEVEL POWER CONVERSION APPARATUS

(75) Inventors: Kimiyuki Koyanagi, Tokyo (JP); Masahiro Kinoshita, Tokyo (JP)

(73) Assignees: MITSUBISHI ELECTRIC CORPORATION, Tokyo (JP); TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 13/503,045

(22) PCT Filed: Nov. 17, 2009

(86) PCT No.: PCT/JP2009/069490
§ 371 (c)(1),
(2), (4) Date: Apr. 20, 2012

(87) PCT Pub. No.: WO2011/061813
PCT Pub. Date: May 26, 2011

(65) Prior Publication Data
US 2012/0205983 A1    Aug. 16, 2012

(51) Int. Cl.
*H02M 7/483*   (2007.01)
*H02M 7/00*    (2006.01)

(52) U.S. Cl.
CPC .............. *H02M 7/003* (2013.01); *H02M 7/483* (2013.01); *Y10T 307/685* (2015.04)

(58) Field of Classification Search
USPC .......... 363/131, 132, 144, 147; 361/735, 760, 361/761, 762, 763, 764, 790
See application file for complete search history.

(56) References Cited

U.S. PATENT DOCUMENTS 8,300,443 B2 * 10/2012 Takizawa ...................... 363/147
2004/0080922 A1 * 4/2004 Aoyagi ......................... 361/793

FOREIGN PATENT DOCUMENTS

| JP | 2001 238458 | 8/2001 |
| JP | 2002 247862 | 8/2002 |
| JP | 2005-160248 | 6/2005 |
| JP | 2008 193779 | 8/2008 |
| JP | 2009 22062 | 1/2009 |

OTHER PUBLICATIONS

Akitake, Japanese Patent Document JP2009-022062 (A)—English Translation.*

(Continued)

*Primary Examiner* — Adolf Berhane
*Assistant Examiner* — Alex Torres-Rivera
(74) *Attorney, Agent, or Firm* — Oblon, McClelland, Maier & Neustadt, L.L.P.

(57) ABSTRACT

Wiring between semiconductor modules and a direct current power supply circuit, which construct a three-level power conversion apparatus, is made to be low inductance, so reduction in size and cost can be attained easily. In cases where a connection is made between direct current power supplies (electrolytic capacitors) and IGBT modules of a three-level inverter, a wiring conductor for a bi-directional switch part is divided into three conductors or two conductors on a same surface, and these conductors are sandwiched by a P conductor and an N conductor, which are arranged at outer sides thereof, respectively, through insulating materials, so a three-layer wiring structure of a sealed structure is formed. As a result, wiring inductance can be made small even with a small number of laminated layers, so that the reduction in size and cost of the apparatus as a whole is achieved.

2 Claims, 9 Drawing Sheets

(56) References Cited

OTHER PUBLICATIONS

Takizawa Akitake, English Translation of Japenese Patent Document JP2009-022062 (A), Jan. 29, 2009.*

International Search Report Issued Feb. 9, 2010 in PCT/JP09/69490 Filed Nov. 17, 2009.
Office Action mailed Nov. 12, 2013, in Japanese Patent Application No. 2011-541748 (with English-language Translation).

* cited by examiner

THREE-LEVEL POWER CONVERSION APPARATUS

TECHNICAL FIELD

The present invention relates to a three-level power conversion apparatus such as an inverter.

BACKGROUND ART

In the past, as a three-level power conversion apparatus, there has been known a three-level inverter with three phases which serves to convert a direct current into an alternating current (for example, see a first patent document).

Figure 9:
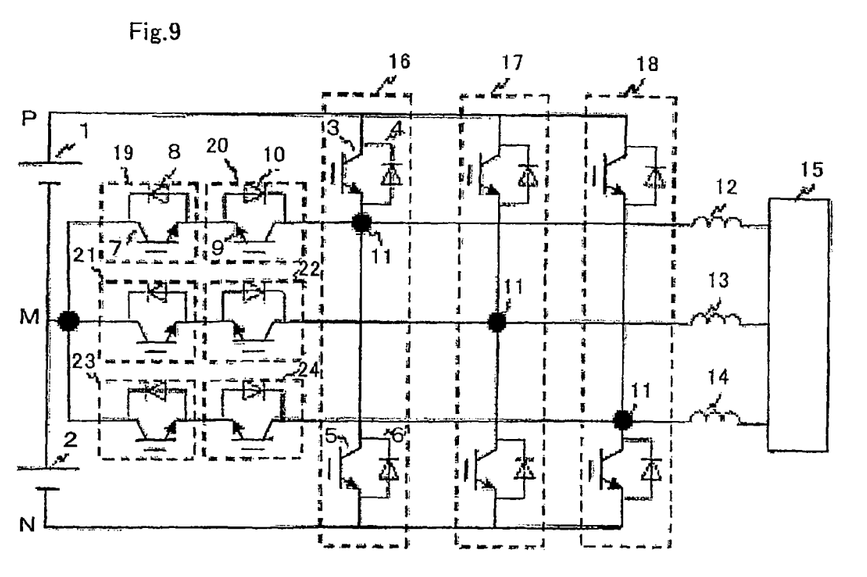
FIG. 9 is a circuit diagram which shows a main circuit construction of a general three-level inverter.

In the following, a conventional apparatus described in the first patent document will be explained with reference to FIG. 9 through FIG. 20. FIG. 9 is a circuit diagram which shows a general three-level power conversion apparatus described in the first patent document, wherein a main circuit construction of a three-level inverter with three phases is illustrated.

In FIG. 9, the three-level inverter is provided with direct current power supplies 1, 2 which are connected in series with each other, and which have a positive side electric potential P (hereinafter referred to as a "P electric potential"), a negative side electric potential N (hereinafter referred to as an "N electric potential"), and a midpoint electric potential M (hereinafter referred to as an "M electric potential"). Here, note that in cases where the direct current power supplies 1, 2 are constructed by an AC power system, in general, a diode rectifier, an electrolytic capacitor of large capacitance (not shown), etc. are used.

An IGBT (insulated gate type bipolar transistor) modules 16, 17, 18 (main switches) are connected between the P electric potential and the N electric potential, and alternating current output terminals (intermediate terminals) 11 of the individual IGBT modules 16, 17, 18 are connected to the M electric potential through IGBT modules 19 through 24 (bi-directional switches), respectively.

An IGBT (switch element) 3 and a diode 4 in the IGBT module 16 are connected to the P electric potential, and an IGBT 5 and a diode 6 therein are connected to the N electric potential.

Each pair of the IGBT modules 19 through 24 construct a bi-directional switch, which is connected between the M electric potential and each alternating current output terminal (intermediate terminal) 11 in the IGBT modules 16 through 18.

The IGBT module 19 is composed of a set of an IGBT 7 and a diode 8 which is connected in anti-parallel to the IGBT 7, and the IGBT module 20 is composed of a set of an IGBT 9 and a diode 10 which is connected in anti-parallel to the IGBT 9.

The IGBT modules 19, 20 (bidirectional switch) are of a construction in which one set of the IGBT and the diode are connected in anti-series to another set of the IGBT and the diode, and the IGBT modules 21 through 24, which correspond to the other two set, are constructed in a similar manner. Here, note that those IGBTs which are connected in anti-series with each other have their emitters commonly connected with each other, but they may instead have their collectors commonly connected with each other.

The three-level inverter has its three-phase output terminals connected to a load 15 through reactors 12, 13, 14 for filtering.

This serves to construct an inverter which can generate an output of three levels (P electric potential, N electric potential, and M electric potential).

In cases where the three-level inverter of FIG. 9 is constructed by IGBT modules and direct current power supply devices (electrolytic capacitors of large capacitance), for example, the IGBT modules 16, 17, 18 are composed of "2 in 1 type" IGBT modules, respectively, and the IGBT modules 19 through 24 are composed of "1 in 1 type" IGBT modules, respectively, and the direct current power supplies 1, 2 are composed of serially connected electrolytic capacitors, respectively. In addition, the IGBT modules 19 through 24 may be composed of "2 in 1 type" IGBT modules.

Figure 10:
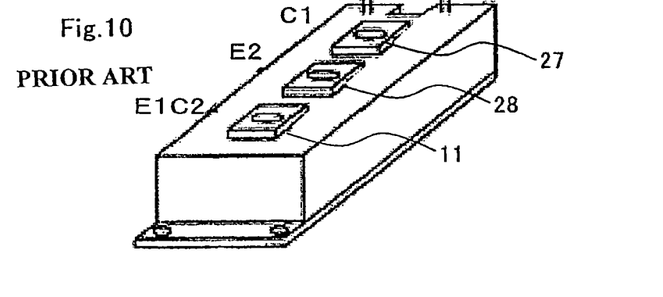
FIG. 10 is an external appearance perspective view which shows a conventional "2 in 1 type" IGBT module.
Figure 11:
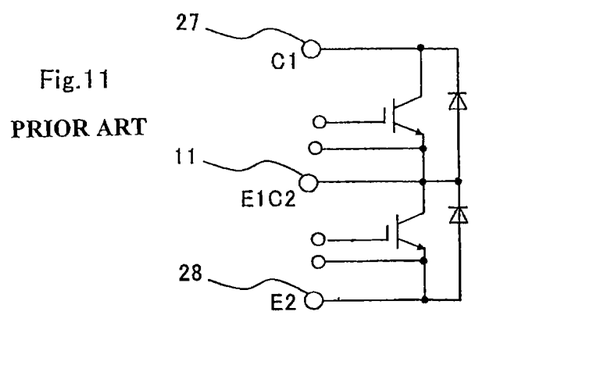
FIG. 11 is an equivalent circuit diagram which shows an internal function of the IGBT module in FIG. 10.

FIG. 10 is an external appearance perspective view which shows a construction example of each of the "2 in 1 type" IGBT modules 16 through 18, and FIG. 11 is an equivalent circuit diagram which shows an internal function in FIG. 10.

In FIG. 10 and FIG. 11, the IGBT module is provided with a collector terminal (C1) 27 that is connected to a P electric potential, an emitter terminal (E2) 28 that is connected to an N electric potential, and an intermediate terminal (emitter/collector terminal E1C2) 11 that is connected to a load output and a bi-directional switch. In general, the individual terminals 27, 28, 11 are constructed in the order as shown in FIG. 10.

Figure 12:
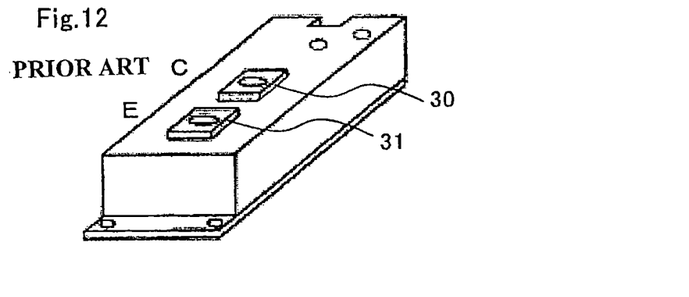
FIG. 12 is an external appearance perspective view which shows a conventional "1 in 1 type" IGBT module.
Figure 13:
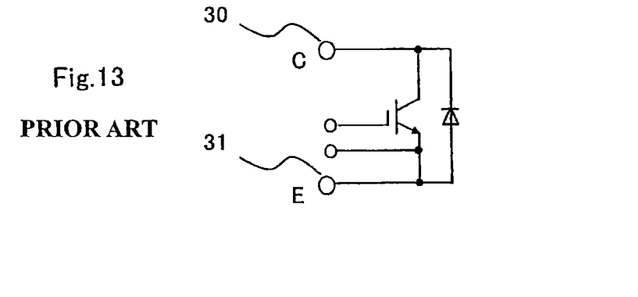
FIG. 13 is an equivalent circuit diagram which shows an internal function of the IGBT module in FIG. 12.

FIG. 12 is an external appearance perspective view which shows a construction example of each of the "1 in 1 type" IGBT modules 19 through 24 (bi-directional switches), and FIG. 13 is an equivalent circuit diagram which shows an internal function in FIG. 12.

In FIG. 12 and FIG. 13, the IGBT module (bi-directional switch) is provided with a collector terminal (C) 30 and an emitter terminal (E) 31.

Figure 14:
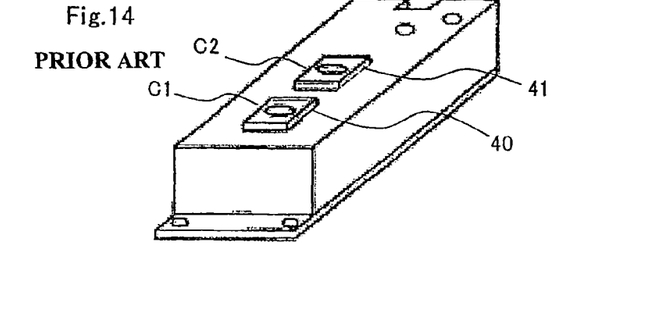
FIG. 14 is an external appearance perspective view which shows a conventional "2 in 1 type" bi-directional switch module.
Figure 15:
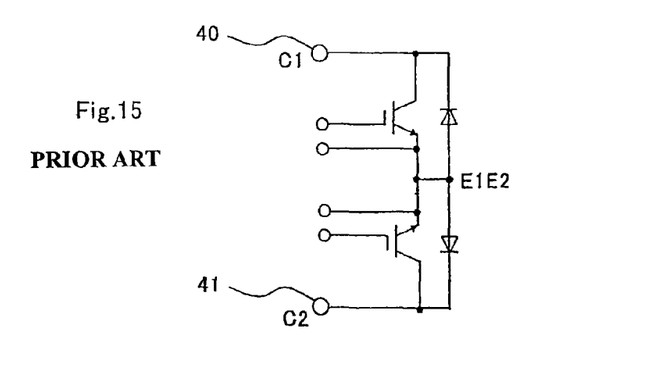
FIG. 15 is an equivalent circuit diagram which shows an internal function of the bi-directional switch module in FIG. 14.

On the other hand, FIG. 14 is an external appearance perspective view which shows a construction example of a "2 in 1 type" bi-directional switch, and FIG. 15 is an equivalent circuit diagram which shows an internal function in FIG. 14.

In FIG. 14 and FIG. 15, IGBT modules (bi-directional switch) are provided with a collector terminal (C1) 40 and a collector terminal (C2) 41.

In cases where the IGBT modules 19 through 24 (bi-directional switches) are composed of modules of the "2 in 1 type", as shown in FIG. 15, they have a common emitter (or a common collector), and hence, individual terminals can be constructed as shown in FIG. 14.

Figure 16:
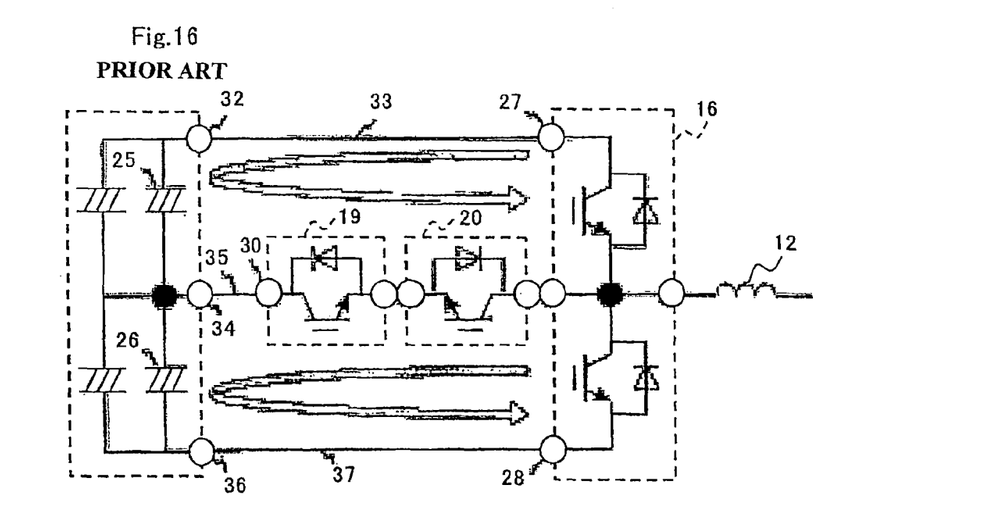
FIG. 16 is a circuit diagram which shows one phase of a conventional three-level inverter.

FIG. 16 is a circuit diagram which shows one phase of the conventional three-level inverter which is described in the first patent document.

In FIG. 16, the IGBT module 16 and electrolytic capacitors 25, 26 are connected to each other, at the side of the P potential, by means of a first conductor 33 which connects between a collector terminal 27 at the side of an upper arm of the IGBT module 16 and a positive side potential terminal 32 of the electrolytic capacitors 25, 26.

In addition, at the side of the N electric potential, the IGBT module 16 and the electrolytic capacitors 25, 26 are connected to each other by means of a second conductor 37 which connects between an emitter terminal 28 at the side of a lower arm of the IGBT module 16 and a negative side electric potential terminal 36 of the electrolytic capacitors 25, 26. At the side of the M electric potential, the IGBT module 16 is connected to a series connection point 34 of the electrolytic capacitors 25, 26 through the IGBT modules 19, 20 (bi-directional switches).

Further, the IGBT modules 19, 20 (bi-directional switches) and the electrolytic capacitors 25, 26 are connected to each other by means of a third conductor 35 that connects between a collector terminal 30 of the IGBT module 19 and the series connection point 34 of the electrolytic capacitors 25, 26.

Figure 17:
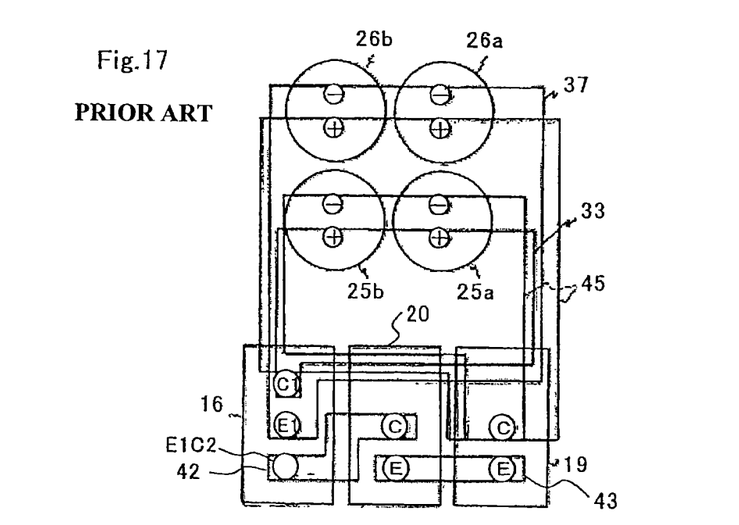
FIG. 17 is a top plan view which shows a state in which one phase of the conventional three-level inverter in FIG. 16.
Figure 18:
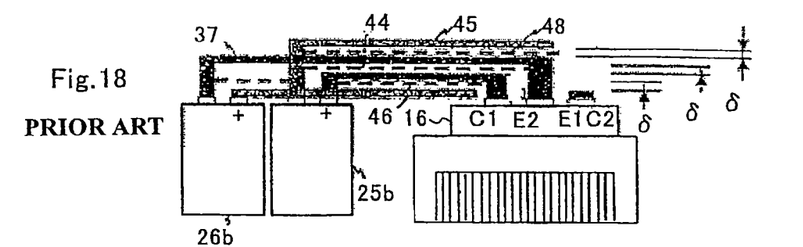
FIG. 18 is a left side view which shows a state in which the three-level inverter in FIG. 17 is seen from a left side thereof.
Figure 19:
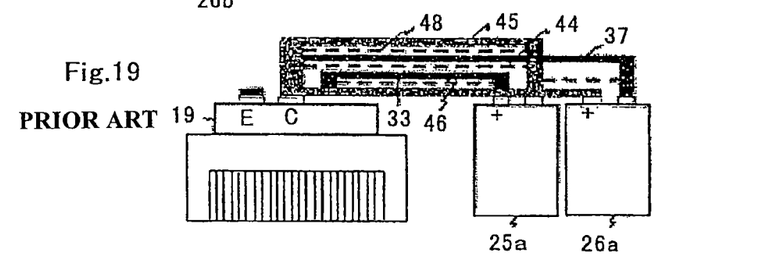
FIG. 19 is a right side view which shows a state in which the three-level inverter in FIG. 17 is seen from a right side thereof.

FIG. 17 through FIG. 19 show the construction of the three-level inverter (for one phase) of FIG. 16. FIG. 17 is a top plan view which shows a state seen from an upper surface thereof. FIG. 18 is a left side view which shows a state seen from a left side thereof. FIG. 19 is s right side view which shows a state seen from a right side thereof.

In FIG. 17 through FIG. 19, in order to distinguish each one pair of series electrolytic capacitors located at the opposite right and left sides, "a" and "b" are attached in such a manner that those electrolytic capacitors which are located at the right side are denoted by 25a, 26a, and those electrolytic capacitors which are located at the left side are denoted by 25b, 26b.

In FIG. 17 through FIG. 19, the first and the second conductors 33, 37 are arranged in proximity with each other through an insulating material 44.

In addition, an electrically connected two-division conductor 45 (corresponding to the third conductor 35 in FIG. 16) is arranged in the vicinity of an anode (series connection point 34) of the electrolytic capacitor 26, and in the vicinity of the collector terminal 30 of the IGBT module 19, so that a proximity structure is thereby achieved in which the first and the second conductors 33, 37 are sandwiched.

However, insulating materials 46, 48 are interposed between the two-division conductor 45 and the first conductor 33, and between the two-division conductor 45 and the second conductor 37, respectively.

The individual interconductor distances between the first conductor 33 and the two-division conductor 45, between the second conductor 37 and the two-division conductor 45, and between the first conductor 33 and the second conductor 37, respectively, all become δ (see FIG. 18), so that a mutual inductance LM of a large value is generated between the individual conductors.

Figure 20:
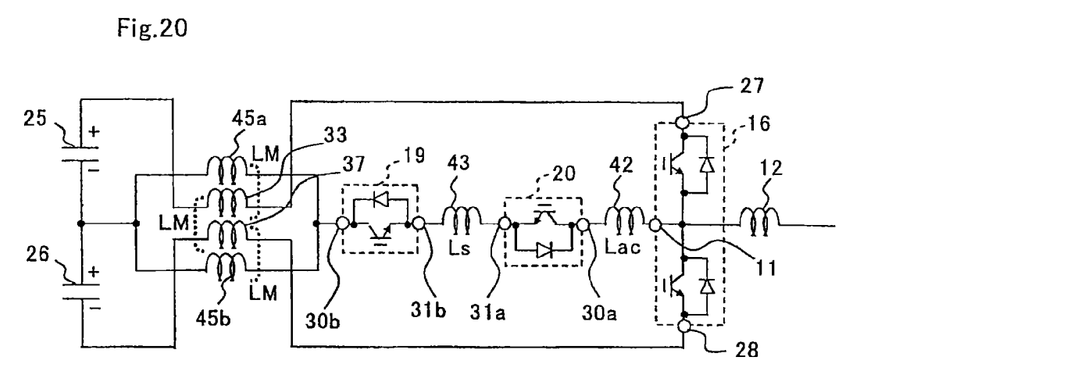
FIG. 20 is an equivalent circuit diagram which shows wiring inductances between individual conductors in FIG. 17 through FIG. 19.

FIG. 20 is an explanatory view which shows mutual inductances LM by means of an equivalent circuit, wherein in the construction of FIG. 16 through FIG. 19, it is shown that the mutual inductances LM of the same magnitude are generated between individual conductors.

In FIG. 20, the two-division conductor 45 as referred to above (FIG. 18 and FIG. 19) is shown as divided into two, i.e., conductors 45a, 45b.

The intermediate terminal 11 of the IGBT module 16 and a collector terminal 30a of the IGBT module 20 are connected to each other by means of a thin fourth conductor 42 (wiring inductance Lac).

In addition, an emitter terminal 31a of the IGBT module 20 and an emitter terminal 31b of the IGBT module 19 are connected to each other by means of a thin fifth conductor 43 (wiring inductance Ls).

By forming wiring between the IGBT module 16 and the electrolytic capacitors 25, 26 into a four-layer laminate structure as in the case of the above-mentioned conventional three-level power conversion apparatus (FIG. 16 through FIG. 20) as referred to above (the first patent document), it is possible to reduce the wiring inductances LM between the IGBT module 19 (bi-directional switch) and the electrolytic capacitors 25, 26. However, other wiring inductances Ls, Lac can not be reduced.

PRIOR ART REFERENCES

Patent Documents

[First Patent Document] Japanese Patent Application Laid-Open No. 2009-22062

SUMMARY OF THE INVENTION

Problems to be Solved by the Invention

Although the conventional three-level power conversion apparatus reduces the wiring inductances between the IGBT module and the electrolytic capacitors (direct current power supply) by the use of the four-layer laminate structure as described above, the thickness of the laminate structure is increased due to the four-layer structure thereof, thus enlarging the size of the apparatus thereby to increase the weight thereof as well. In particular, in the three-phase three-level power conversion apparatus, there has been a problem that the amount of increase in weight exerts an influence with its magnitude becoming about 3 times as large as the original.

In addition, as shown in FIG. 17 through FIG. 20, the intermediate terminal of the IGBT module 16 and the collector terminal of the IGBT module 20 (bi-directional switch) as well as the emitter terminal 31a of the IGBT module 20 and the emitter terminal 31b of the IGBT module 19 are connected to each other by means of the thin conductors 42, 43, respectively, instead of the laminate structure, and hence, there has been a problem that the wiring inductances Ls, Lac can not be reduced.

The present invention has been made in order to solve the problems as referred to above, and has for its object to obtain a three-level power conversion apparatus which is capable of reducing the wiring inductance between a bi-directional switch part (e.g., the IGBT modules 19 through 24) and a main switch part (e.g., the IGBT modules 16 through 18), and which at the same time is small in size and low in cost.

Means for Solving the Problems

A three-level power conversion apparatus according to the present invention is provided with: a direct current power supply circuit that has a positive side terminal; a negative side terminal and an intermediate potential point; a semiconductor module that is inserted between the positive side terminal and the negative side terminal; and a bi-directional switch that is inserted between the intermediate potential point and the semiconductor module; wherein the semiconductor module is composed of: a first switch element with a collector thereof connected to the positive side terminal of the direct current power supply circuit, and a diode connected in anti-parallel to the first switch element; and a second switch element with an emitter thereof connected to the negative side terminal of the direct current power supply circuit, and a diode connected in anti-parallel to the second switch element; and wherein the bi-directional switch is composed of a series circuit including a third bidirectional switch element and a fourth bidirectional switch element that are connected between a connection point of an emitter of the first switch element and a collector of the second switch element, and the intermediate potential point of the direct current power supply circuit; and wherein an electric potential of three levels is outputted from an output terminal of the semiconductor module. The three-level power conversion apparatus is further provided with: a first conductor that makes a connection between the positive side terminal of the direct current power supply circuit and the first switch element; a second conductor that makes a connection between the negative side terminal of the direct current power supply circuit and the second switch element; a third conductor that makes a connection between the intermediate potential point of the direct current power supply circuit and the third switch element; a fourth conductor that makes a connection between the fourth switch element and the connection point; and a fifth conductor that makes a connection between the third switch element and the fourth switch element; wherein the third through fifth conductors are arranged on a same surface, and the first conductor, the second conductor and the third through fifth conductors are arranged in a superposed manner so that a three-layer wiring structure is thereby achieved.

Effect of the Invention

According to the present invention, by arranging a divided conductor at an intermediate potential side between a first conductor at a positive side, and a second conductor at a negative side in such a manner that the first conductor, the second conductor and the divided conductor are arranged in a superposed manner so as to form a three-layer wiring structure, it becomes possible to provide a circuit in which the wiring inductance between the bi-directional switch part and the main switch part is reduced, and which at the same time is small in size and low in cost due to the three-layer wiring structure having a small number of laminated layers.

MODES FOR CARRYING OUT THE INVENTION (First Embodiment)

Figure 1:
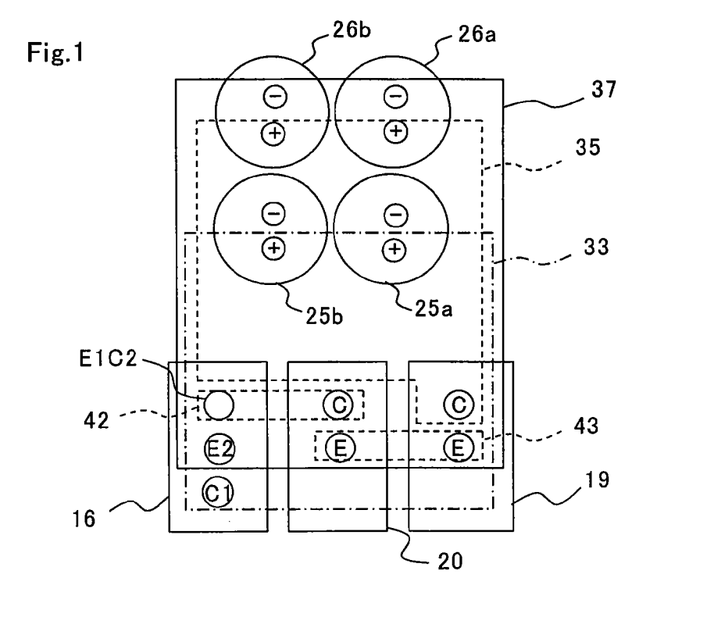
FIG. 1 is a top view which shows a state in which one phase of a three-level power conversion apparatus according to a first embodiment of the present invention is seen from an upper surface thereof. (First Embodiment)
Figure 2:
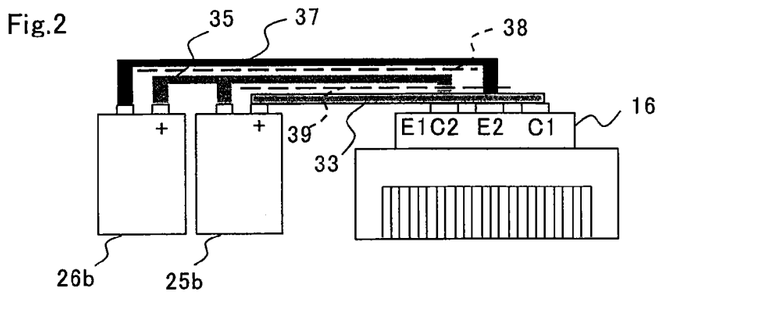
FIG. 2 is a left side view which shows a state in which the three-level power conversion apparatus in FIG. 1 is seen from a left side thereof. (First Embodiment)

FIG. 1 is a top plan view which shows a three-level power conversion apparatus according to a first embodiment of the present invention, wherein a state in which one phase of three phases thereof is seen from an upper surface thereof is shown. FIG. 2 is a left side view which shows a state in which the three-level power conversion apparatus in FIG. 1 is seen from a left side thereof, and FIG. 3 is a right side view which shows a state in which the three-level power conversion apparatus in FIG. 1 is seen from a right side thereof.

Figure 3:
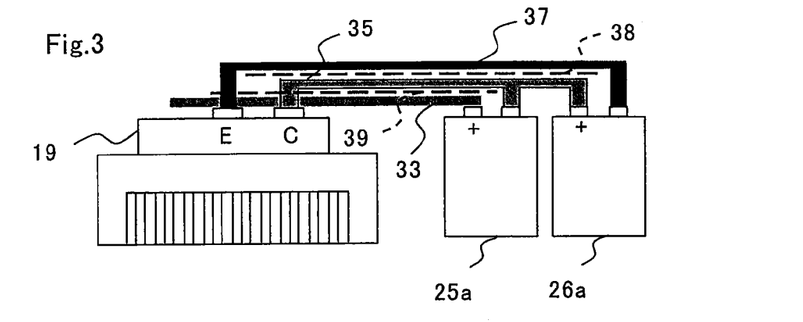
FIG. 3 is a right side view which shows a state in which the three-level power conversion apparatus in FIG. 1 is seen from a right side thereof. (First Embodiment)
Figure 4:
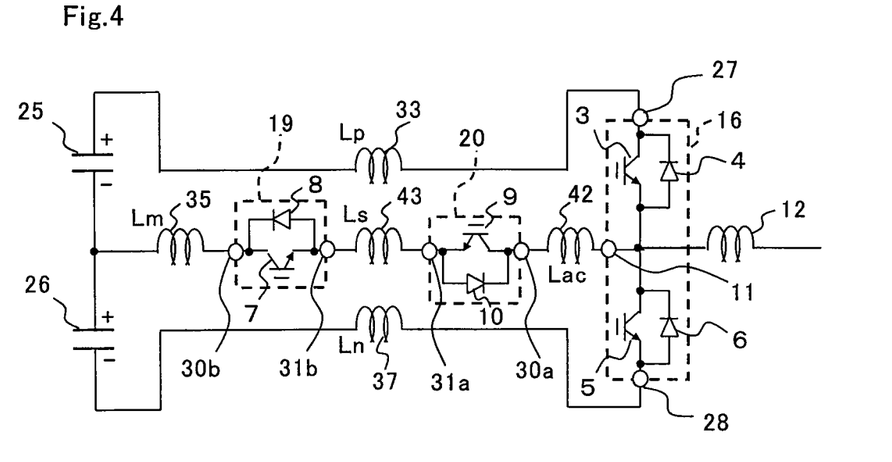
FIG. 4 is an equivalent circuit diagram which shows wiring inductances between individual conductors in FIG. 1 through FIG. 3. (First Embodiment)

In addition, FIG. 4 is an equivalent circuit diagram which shows one phase of the three-level power conversion apparatus shown in FIG. 1 through FIG. 3.

Here, note that the overall construction of the three-level power conversion apparatus according to the first embodiment of the present invention is as shown in FIG. 9.

In FIG. 1 through FIG. 4, those which are similar to the above-mentioned ones (see FIG. 17 through FIG. 20) are denoted by the same reference numerals and characters as those referred to above.

The one phase of the three-level power conversion apparatus is provided with an IGBT module 16 that has a collector terminal C1, an emitter terminal E2 and an emitter/collector terminal E1C2, IGBT modules 19, 20 (bi-directional switch) that have collector terminals (C) 30b, 30a and emitter terminals (E) 31b, 31a, respectively, and electrolytic capacitors 25 (25a, 25b) and electrolytic capacitors 26 (26a, 26b) that which constitute direct current power supplies, respectively.

As shown in FIG. 4, the IGBT module 16 is composed of a first switch element 3 that has a collector terminal (C1) 27 connected to a positive side terminal (+) (P electric potential) of an electrolytic capacitor 25, a diode 4 that is connected in anti-parallel to the first switch element 3, a second switch element 5 that has an emitter terminal (E2) 28 connected to a negative side terminal (−) (N electric potential) of an electrolytic capacitor 26, and a diode 6 that is connected in anti-parallel to the second switch element 5.

The intermediate terminal 11 (the emitter/collector terminal E1C2) of the IGBT module 16 is connected to the IGBT modules 19, 20 (bi-directional switch), and at the same time is connected to a load 15 (see FIG. 9) through a reactor 12 for filtering.

A connection point between the first switch element 3 and the diode 4 in the IGBT module 16 and between the second switch element 5 and the diode 6 therein is connected to a series connection point of the electrolytic capacitors 25, 26 through the IGBT modules 19, 20 (bi-directional switch).

The IGBT module 19 has a third switch element 7, and the IGBT module 20 has a fourth switch element 9. The IGBT modules 19, 20 (bi-directional switch) are composed of a series circuit of the third switch element 7 and the fourth switch element 9.

The collector terminal (C1) 27 of the IGBT module 16 and the positive side terminal (+) of the electrolytic capacitor 25 are electrically connected to each other by means of a first conductor 33 (wiring inductance Lp).

In addition, the emitter terminal (E2) 28 of the IGBT module 16 and the negative side terminal (−) of the electrolytic capacitor 26 are electrically connected to each other by means of a second conductor 37 (wiring inductance Ln).

The collector terminal (C) 30b of the IGBT module 19 (bi-directional switch), and the series connection point of the electrolytic capacitors 25, 26 (between a cathode of the electrolytic capacitor 25 and an anode of the electrolytic capacitor 26) are electrically connected to each other by means of a third conductor 35 (wiring inductance Lm).

In addition, the intermediate terminal (E1C2) 11 of the IGBT module 16 and the collector terminal (C) 30a of the IGBT module 20 (bi-directional switch) are electrically connected to each other by means of a fourth conductor 42 (wiring inductance Lac).

Moreover, the emitter terminal (C) 31a of the IGBT module 20 (bi-directional switch) and the emitter terminal (E) 31b of the IGBT module 19 (bi-directional switch) are electrically connected to each other by means of a fifth conductor 43 (wiring inductance Ls).

The third through the fifth conductors 35, 42, 43 are arranged on the same surface, as shown in FIG. 1 through FIG. 3.

In addition, as shown in FIG. 2 and FIG. 3, the third conductor 35 is arranged between the first conductor 33 and the second conductor 37, and the fourth and the fifth conductors 42, 43 are sandwiched by insulating materials 38, 39 so as to form a close contact structure. Here, the insulating material 39 is interposed between the third conductor 35 (lying on the same plane as the fourth and the fifth conductors 42, 43) and the first conductor 33, and the insulating material 38 is interposed between the third conductor 35 and the second conductor 37. According to this, wiring of a three-layer laminate structure is formed.

Here, note that in FIG. 1 through FIG. 4, the first through the fifth conductors 33, 37, 35, 42, 43 related to the IGBT module 16 for one phase have been shown, but it is assumed that the same wiring or connection structure is also provided in each of the IGBT modules 17, 18 (see FIG. 9) of the other two phases.

In addition, in FIG. 1 through FIG. 3, there is shown an example in which "the first conductor 33", "the third through the fifth conductors 35, 42, 43 arranged on the same surface", and "the second conductor 37" are laminated in this order from the lower layer side, but they are not limited to such a laminate structure.

For example, they may be laminated in such a manner that the first conductor 33 is placed between the second conductor 37 and the third through the fifth conductors 35, 42, 43, or they may be laminated such that the second conductor 37 is placed between the first conductor 33 and the third through the fifth conductors 35, 42, 43.

Moreover, in the above-mentioned description, there has been shown the IGBT module 16 for one phase alone, but it goes without saying that the same structure is provided for each of the IGBT modules 17, 18 (see FIG. 9) of the other two phases.

That is, as shown in FIG. 9, similarly to the case where corresponding to the first IGBT module 16, the first IGBT modules 19, 20 (bi-directional switches) are connected thereto, a second and a third IGBT module (bi-directional switch) are also connected to the second and the third IGBT module 17, 18 (not shown in FIG. 1 through FIG. 4), respectively.

As described above, the three-level power conversion apparatus according to the first embodiment of the present invention (FIG. 1 through FIG. 4) is provided with the electrolytic capacitors 25, 26 (direct current power supply circuit) that each have a positive side terminal (P, +), a negative side terminal (N, −) and an intermediate potential point (M), the IGBT module 16 (17, 18) that is inserted between the positive side terminal (+) and the negative side terminal (−), and the IGBT modules 19, 20 (bi-directional switch) that are inserted between the intermediate potential point (M) and the IGBT module 16 (17, 18), wherein the IGBT module 16 (17, 18) of each phase has the first switch element 3 with its collector connected to the positive side terminal (+) of the electrolytic capacitor 25, and the second switch element 5 with its emitter connected to the negative side terminal (−) of the electrolytic capacitor 26, and wherein an electric potential of three levels is outputted from an output terminal of the IGBT module 16 (17, 18).

The IGBT modules 19, 20 (bi-directional switch) is composed of a series circuit which comprises the third bidirectional switch element 7 and the fourth bidirectional switch element 9 that are connected between a connection point (intermediate terminal 11) of the emitter of the first switch element 3 and the collector of the second switch element 5, and the intermediate potential point (M) of the electrolytic capacitors 25, 26.

In addition, the three-level power conversion apparatus is further provided with: the first conductor 33 that makes a connection between the positive side terminal (+) of the electrolytic capacitor 25 and the first switch element 3; the second conductor 37 that makes a connection between the negative side terminal (−) of the electrolytic capacitor 26 and the second switch element 5; and the third through the fifth conductors 35, 42, 43 (three-divided conductor) that make connections between the intermediate potential point of the electrolytic capacitors 25, 26 and the third and the fourth switch elements 7, 9, respectively.

The third conductor 35 makes a connection between the intermediate potential point of the electrolytic capacitors 25, 26 (direct current power supply circuit) and the third switch element 7. The fourth conductor 42 makes a connection between the fourth switch element 9 and the connection point (the intermediate terminal 11). The fifth conductor 43 makes a connection between the third switch element 7 and the fourth switch element 9.

The third through the fifth conductors 35, 42, 43 are arranged on the same surface, and the first conductor 33, the second conductor 37 and the three-divided third through fifth conductors 35, 42, 43 are arranged in a superposed manner so as to achieve a three-layer wiring structure.

In this manner, by forming the three-layer wiring structure with a small number of layers, it is possible to achieve the three-level power conversion apparatus which is small in size and low in cost.

Moreover, in the wiring or interconnection structure between the electrolytic capacitors 25, 26 (direct current power supplies) and the IGBT module 16 (17, 18), a wiring conductor for an intermediate potential part of the electrolytic capacitors 25, 26 is formed by the third through the fifth conductors 35, 42, 43 which are divided into three pieces on the same surface, and further, the third through the fifth conductors 35, 42, 43 are sandwiched by the first and the second conductors 33, 37 at the PN (positive and negative pole) sides, and at the same time are formed into a close contact structure through the insulating materials 38, 39.

According to such a construction, the wiring inductance Lm between the electrolytic capacitors 25, 26 (direct current power supplies) and the IGBT module 16 (17, 18) can be reduced, and at the same time, the wiring inductances Ls, Lac, which have not been able to be reduced with the conventional apparatus (FIG. 17 through FIG. 20), can also be reduced.

(Second Embodiment)

Here, note that in the above-mentioned first embodiment (FIG. 1 through FIG. 4), the IGBT modules 19, 20 (the third and the fourth switch elements 7, 9), which construct a bi-directional switch, are formed into individual separate circuits from each other, but as shown in FIG. 5 through FIG. 8, there may be used an IGBT module 49 (bi-directional switch) of a single construction in which the third and the fourth switch elements 7, 9 are unified or integrated with each other inside a package.

Figure 5:
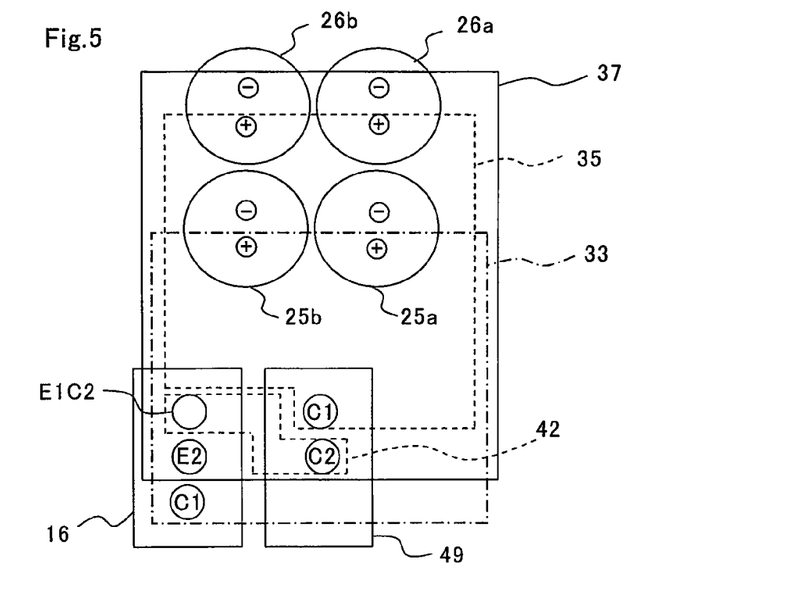
FIG. 5 is a top view which shows a state in which one phase of a three-level power conversion apparatus according to a second embodiment of the present invention is seen from an upper surface thereof. (Second Embodiment)
Figure 6:
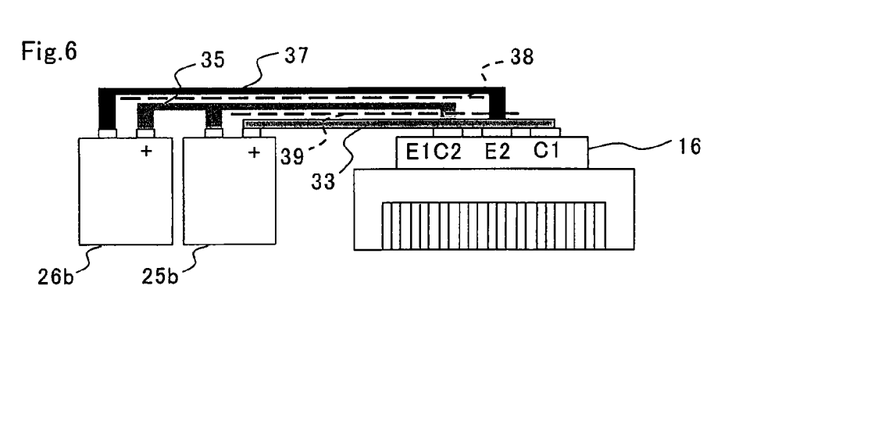
FIG. 6 is a left side view which shows a state in which the three-level power conversion apparatus in FIG. 5 is seen from a left side thereof. (Second Embodiment)

FIG. 5 is a top plan view which shows a three-level power conversion apparatus according to a second embodiment of the present invention, wherein a state in which one phase of three phases thereof is seen from an upper surface thereof is shown, similarly as mentioned above. FIG. 6 is a left side view which shows a state in which the three-level power conversion apparatus in FIG. 5 is seen from a left side thereof, and FIG. 7 is a right side view which shows a state in which the three-level power conversion apparatus in FIG. 5 is seen from a right side thereof.

Figure 7:
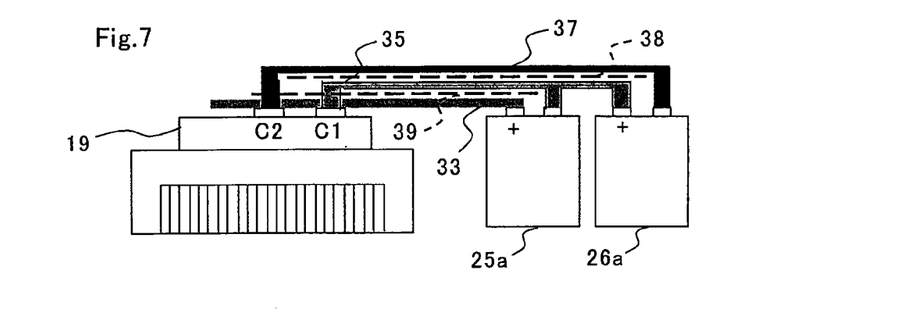
FIG. 7 is a right side view which shows a state in which the three-level power conversion apparatus in FIG. 5 is seen from a right side thereof. (Second Embodiment)
Figure 8:
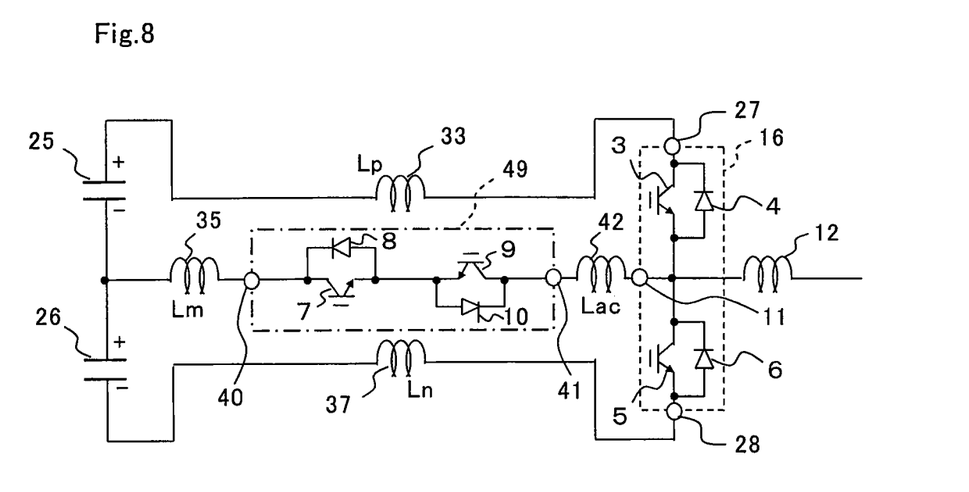
FIG. 8 is an equivalent circuit diagram which shows wiring inductances between individual conductors in FIG. 5 through FIG. 7. (Second Embodiment)

In addition, FIG. 8 is an equivalent circuit diagram which shows one phase of the three-level power conversion apparatus shown in FIG. 5 through FIG. 7.

Here, note that the overall construction of the three-level power conversion apparatus according to the second embodiment of the present invention is as shown in FIG. 9.

In FIG. 5 through FIG. 8, those which are similar to the above-mentioned ones (see FIG. 1 through FIG. 4) are denoted by the same reference numerals and characters as those referred to above.

The IGBT module 49 (bi-directional switch) in FIG. 5 and FIG. 8 is composed of the same "2 in 1 type" IGBT module as mentioned above in FIG. 14 and FIG. 15, and is provided with a collector terminal (C1) 40 and a collector terminal (C2) 41.

The left side view (FIG. 6) of FIG. 5 is the same as that of FIG. 2.

As shown in FIG. 5 through FIG. 8, the three-level power conversion apparatus is provided with: a first conductor 33 that serves to electrically connect a positive side terminal (+) of an electrolytic capacitor 25 (25a, 25b) and a collector terminal (C1) 27 of an IGBT module 16 to each other; a second conductor 37 that serves to electrically connect a negative side terminal 36 of an electrolytic capacitor 26 (26a, 26b) and an emitter terminal (E2) 28 of the IGBT module 16 to each other; a third conductor 35 that serves to electrically connect a negative pole or cathode (−) of the electrolytic capacitor 25 and a positive pole or anode (+) of the electrolytic capacitor 26 to the collector terminal (C1) 40 of the IGBT module 49 ("2 in 1 type" bi-directional switch); and a fourth conductor 42 that serves to electrically connect the collector terminal (C2) 41 of the IGBT module 49 and an intermediate terminal (E1C2) 11 of the IGBT module 16 to each other.

Similarly as stated above, the first conductor 33, the second conductor 37, and the third and the fourth conductors 35, 42 are arranged in a superposed manner so as to form a close contact structure, as a result of which wiring of a three-layer laminate structure is constructed.

Here, note that in FIG. 5 through FIG. 7, there is shown an example in which the first conductor 33, the third and the fourth conductors 35, 42 arranged on the same surface, and the second conductor 37 are laminated in this order, but the first conductor 33 is not limited to this.

For example, the first conductor 33 may be laminated in such a manner that the first conductor 33 is placed between the second conductor 37 and the third and the fourth conductors 35, 42, or it may be laminated such that the second conductor 37 is placed between the first conductor 33 and the third and the fourth conductors 35, 42.

By forming the three-layer wiring structure as shown in FIG. 5 through FIG. 8, it becomes possible to provide a circuit which is small in size and low in cost, similarly as stated above.

In addition, the wiring of the three-layer laminate structure is constructed by placing the third and the fourth conductors 35, 42 on the same surface, and also placing the third and the fourth conductors 35, 42 between the first conductor 33 and the second conductor 37, and further placing or sandwiching the third and the fourth conductors 35, 42 between the insulating materials 38, 39 so as to form the close contact structure.

Moreover, as shown in FIG. 8, by using the IGBT module 49 ("2 in 1 type" bi-directional switch) in which the third and the fourth switch elements 7, 9 are unified or integrated with each other inside the same package, it is possible to reduce the wiring inductance Lm between the electrolytic capacitors 25, 26 (direct current power supplies) and the IGBT module 16 (17, 18), and at the same time, to reduce the wiring inductance Lac between the IGBT module 49 and the IGBT module 16, which have not been able to be reduced with the conventional apparatus (FIG. 17 through FIG. 20).

As described above, in the three-level power conversion apparatus according to the second embodiment of the present invention (FIG. 5 through FIG. 8), in place of the IGBT modules 19, 20 as mentioned above (FIG. 1 and FIG. 4), the IGBT module 49 (the "2 in 1 type" bi-directional switch), in which the third and the fourth switch elements 7, 9 are unified or integrated with each other, is inserted between a connection point (intermediate terminal 11) of an emitter of the first switch element 3 and a collector of the second switch element 5, and an intermediate potential point (M) of the electrolytic capacitors 25, 26.

In addition, the three-level power conversion apparatus is further provided with: the first and the second conductors 33, 37 similar to those as mentioned above; the third conductor 35 that makes a connection between the intermediate potential point of the electrolytic capacitors 25, 26 and the IGBT module 49 (the third and the fourth switch elements 7, 9); and the fourth conductor 42 that makes a connection between the IGBT module 49 and the intermediate terminal 11 of the IGBT module 16 (the first and the second switch elements 3, 5).

The first conductor 33, the second conductor 37, and the third and the fourth conductors 35, 42 (two-divided conductor) are of the three-layer wiring structure through the insulating materials 38, 39, and are arranged in a superposed manner. That is, between the first conductor 33 and the second conductor 37, the third and the fourth conductors 35, 42 are sandwiched by the insulating materials 38, 39, so that the close contact structure and the three-layer wiring structure are thereby achieved.

Thus, in the wiring structure between a direct current power supply circuit (the electrolytic capacitors 25, 26) and the IGBT module 16 (17, 18) of each phase, it is constructed such that a wiring conductor for the intermediate potential part of the electrolytic capacitors 25, 26 is divided into two conductors on the same surface, and these conductors are sandwiched by the first and the second conductors 33, 37 at the PN (positive and negative pole) sides. According to such a construction, similarly as mentioned above, with the wiring structure having a small number of layers, it is possible to achieve the three-level power conversion apparatus which is able to reduce wiring inductances between the direct current power supplies and the modules and which is small in size and low in cost.

Here, note that in the above-mentioned first and second embodiments, the description has been made by taking the case of the three-level power conversion apparatus of three phases as a three-level power conversion apparatus, but it goes without saying that the present invention can also be applied to a three-level power conversion apparatus of a single phase, and operational effects equivalent to those as mentioned above will be attained.

In addition, although the IGBT module 16 (17, 18) has been used as a semiconductor module which constructs a main switch part, there may be used other semiconductor modules such as a MOSFET, etc.

[Explanation of Reference Numerals and Characters]

3 first switch element, 5 second switch element, 7 third switch element, 9 fourth switch element, 4, 6 diodes, 11 intermediate terminal (alternating current output terminal), 15 load, 16 through 18 IGBT modules, 19 through 24, 49 IGBT modules (bi-directional switches), 25, 25a, 25b, 26, 26a, 26b electrolytic capacitors (direct current power supply circuit), 33 first conductor, 35 third conductor, 37 second conductor, 42 fourth conductor, fifth conductor, 38, 39 insulating materials, Lp, Lm, Ln, Lac, Ls wiring inductances.

The invention claimed is:

1. A three-level power conversion apparatus comprising:
a direct current power supply circuit that has a positive side terminal, a negative side terminal and an intermediate potential point;
a semiconductor module that is inserted between said positive side terminal and said negative side terminal; and
a bi-directional switch that is inserted between said intermediate potential point and said semiconductor module;
wherein said semiconductor module is composed of:
a first switch element with a collector thereof connected to the positive side terminal of said direct current power supply circuit, and a diode connected in anti-parallel to said first switch element; and
a second switch element with an emitter thereof connected to the negative side terminal of said direct current power supply circuit, and a diode connected in anti-parallel to said second switch element;
wherein said bi-directional switch is composed of a series circuit including a third switch element and a fourth switch element that are connected between a connection point of an emitter of said first switch element and a collector of said second switch element, and the intermediate potential point of said direct current power supply circuit;
wherein an electric potential of three levels is outputted from an output terminal of said semiconductor module;
wherein said three-level power conversion apparatus further comprises:
a first conductor that makes a connection between the positive side terminal of said direct current power supply circuit and said first switch element;
a second conductor that makes a connection between the negative side terminal of said direct current power supply circuit and said second switch element;
a third conductor that makes a connection between the intermediate potential point of said direct current power supply circuit and said third switch element;
a fourth conductor that makes a connection between said fourth switch element and said connection point; and
a fifth conductor that makes a connection between said third switch element and said fourth switch element;
wherein said third conductor, said fourth conductor and said fifth conductor are electrically separate and coplanar;
wherein said first conductor, said second conductor and said third conductor, said fourth conductor and said fifth conductor are arranged in a superposed manner on said semiconductor module and said bi-directional switch so that a three-layer wiring structure is thereby achieved, and
said third conductor, said fourth conductor and said fifth conductor are separate and are arranged between said first and second conductors, and at the same time, said third conductor, said fourth conductor and said fifth conductor are disposed between insulating materials to form a close contact structure.

2. A three-level power conversion apparatus comprising:
a direct current power supply circuit that has a positive side terminal, a negative side terminal and an intermediate potential point,
a semiconductor module that is inserted between said positive side terminal and said negative side terminal; and
a bi-directional switch that is inserted between said intermediate potential point and said semiconductor module;
wherein said semiconductor module is composed of:
a first switch element with a collector thereof connected to the positive side terminal of said direct current power supply circuit, and a diode connected in anti-parallel to said first switch element; and
a second switch element with an emitter thereof connected to the negative side terminal of said direct current power supply circuit, and a diode connected in anti-parallel to said second switch element;
wherein said bi-directional switch is composed of a series circuit including a third switch element and a fourth switch element that are connected between a connection point of an emitter of said first switch element and a collector of said second switch element, and the intermediate potential point of said direct current power supply circuit;
wherein an electric potential of three levels is outputted from an output terminal of said semiconductor module;
wherein said three-level power conversion apparatus further comprises:
a first conductor that makes a connection between the positive side terminal of said direct current power supply circuit and said first switch element;
a second conductor that makes a connection between the negative side terminal of said direct current power supply circuit and said second switch element;
a third conductor that makes a connection between the intermediate potential point of said direct current power supply circuit and said series circuit; and
a fourth conductor that makes a connection between said series circuit and said connection point;
wherein said third and fourth conductors are electrically separate and coplanar;
wherein said first conductor, said second conductor and said third and fourth conductors are arranged in a superposed manner on said semiconductor module and said bi-directional switch so that a three-layer wiring structure is thereby achieved; and wherein said third switch element and said fourth switch element are arranged inside a same package, and said third and fourth conductors are separate and are arranged between said first and second conductors, and, said third and fourth conductors are disposed between insulating materials to form a close contact structure.

\* \* \* \* \*